(12) United States Patent
Tao et al.

(10) Patent No.: US 11,882,620 B2
(45) Date of Patent: Jan. 23, 2024

(54) COMMUNICATION METHOD AND APPARATUS

(71) Applicant: Huawei Technologies Co., Ltd., Shenzhen (CN)

(72) Inventors: Maozhi Tao, Dongguan (CN); Fei Jiao, Xi'an (CN); Zhenghu Ding, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 426 days.

(21) Appl. No.: 17/320,948

(22) Filed: May 14, 2021

(65) Prior Publication Data
US 2021/0274590 A1 Sep. 2, 2021

Related U.S. Application Data

(63) Continuation of application No. PCT/CN2018/116009, filed on Nov. 16, 2018.

(51) Int. Cl.
H04W 76/38 (2018.01)
H04W 72/044 (2023.01)
H04W 72/0446 (2023.01)

(52) U.S. Cl.
CPC ....... *H04W 76/38* (2018.02); *H04W 72/0446* (2013.01); *H04W 72/0473* (2013.01)

(58) Field of Classification Search
None
See application file for complete search history.

(56) References Cited

U.S. PATENT DOCUMENTS

| 7,689,221 | B1 | 3/2010 | Gazzard |
| 2007/0077934 | A1 | 4/2007 | Chindapol et al. |
| 2015/0296451 | A1 | 10/2015 | Friman et al. |
| 2018/0020467 | A1* | 1/2018 | Nouah ................. H04L 5/0044 |
| 2019/0281607 | A1* | 9/2019 | Gao ..................... H04B 7/0408 |

FOREIGN PATENT DOCUMENTS

| CN | 101247148 A | 8/2008 |
| CN | 102026304 A | 4/2011 |
| CN | 108092755 A | 5/2018 |

(Continued)

OTHER PUBLICATIONS

3GPP TS 23.203 V15.4.0 (Sep. 2018), 3rd Generation Partnership Project; Technical Specification Group Services and System Aspects; Policy and charging control architecture (Release 15), 261 pages.

*Primary Examiner* — Kenny S Lin
(74) *Attorney, Agent, or Firm* — Slater Matsil, LLP

(57) ABSTRACT

A communication method and an apparatus are provided. The method includes: A network device determines, in a first time domain unit, whether data of N to-be-scheduled terminals in a second time domain unit in M cells of the network device is delay-sensitive data; and if the network device determines that data of K to-be-scheduled terminals of the N to-be-scheduled terminals is delay-sensitive data, the K to-be-scheduled terminals are separately located in P cells of the M cells, and a power required for sending the delay-sensitive data in each of the P cells is less than or equal to a preset power threshold corresponding to the cell, the network device sends the data of the K to-be-scheduled terminals in a second time domain unit of the P cells.

20 Claims, 11 Drawing Sheets

(56) References Cited

FOREIGN PATENT DOCUMENTS

| | | |
|---|---|---|
| EP | 1209940 A1 | 5/2002 |
| JP | 2012119810 A | 6/2012 |
| JP | 2014230131 A | 12/2014 |
| WO | 2016124974 A1 | 8/2016 |

\* cited by examiner

COMMUNICATION METHOD AND APPARATUS

CROSS-REFERENCE TO RELATED APPLICATIONS

This application is a continuation of International Application No. PCT/CN2018/116009, filed on Nov. 16, 2018, the disclosure of which is hereby incorporated by reference in its entirety.

TECHNICAL FIELD

This application relates to the field of communications technologies, and in particular, to a communication method and an apparatus.

BACKGROUND

An orthogonal frequency division multiplex (OFDM) technology is introduced to a long term evolution (LTE) system, and two basic working modes, namely, frequency division duplex (FDD) and time division duplex (TDD), are further supported.

For an LTE FDD system, a frame structure 1 (FS1) is used. In the FDD system, different carrier frequencies are used for uplink transmission and downlink transmission, and a same frame structure is used for both uplink transmission and downlink transmission. On each carrier, a radio frame with a length of 10 ms includes 10 subframes with a length of 1 ms, and each subframe is divided into two slots with a length of 0.5 ms. A TTI for uplink and downlink data sending is 1 ms. For an LTE TDD system, a frame structure 2 (FS2) is used. In the TDD system, different subframes or different slots on a same frequency are used for uplink transmission and downlink transmission. In the FS2, each 10-ms radio frame includes two 5-ms half-frames, and each half-frame includes five 1-ms subframes. Subframes in the FS2 are classified into three types: a downlink subframe, an uplink subframe, and a special subframe. Each special subframe includes three parts: a downlink transmission slot (Downlink Pilot Time Slot, DwPTS), a guard period (GP), and an uplink transmission slot (UpPTS). Each half-frame includes at least one downlink subframe, at least one uplink subframe, and a maximum of one special subframe. A downlink subframe in the LTE TDD system is used as an example. When a normal cyclic prefix (cyclic prefix, CP) is used, one slot includes seven OFDM symbols. Therefore, from a perspective of a time domain, each subframe includes 14 OFDM symbols, and each symbol occupies $\frac{1}{14}$ ms.

A bandwidth of the LTE system is relatively large, and a transmit power is relatively high. Consequently, power consumption of a single carrier is relatively high. To reduce power consumption, for some subframes, if there is no data to be sent in the subframes within the entire bandwidth range, and only a common signal such as a common reference signal (CRS) is included, symbol power saving may be performed, that is, a power amplifier (PA) works on a symbol in which the CRS is located in the subframe, and the PA is disabled on another symbol, thereby reducing a waste of power.

However, in a co-power amplifier scenario (that is, a plurality of cells belonging to a same base station share a same PA), symbol power saving can be performed only when the plurality of cells have no data to send in one subframe. Consequently, an effective proportion of symbol power saving is relatively low. Therefore, how to improve power-saving benefits of a base station in the co-power amplifier scenario needs to be further studied.

SUMMARY

In view of this, embodiments of this application provide a communication method and an apparatus, to improve power-saving benefits of a network device.

According to a first aspect, an embodiment of this application provides a communication method. The method includes the following.

A network device determines, in a first time domain unit, whether data of N to-be-scheduled terminals in a second time domain unit in M cells of the network device is delay-sensitive data, where the M cells share a same remote radio unit RRU.

If the network device determines that data of K to-be-scheduled terminals of the N to-be-scheduled terminals is delay-sensitive data, the K to-be-scheduled terminals are separately located in P cells of the M cells, and a power required for sending the delay-sensitive data in each of the P cells is less than or equal to a preset power threshold corresponding to the cell, the network device sends the data of the K to-be-scheduled terminals in a second time domain unit of the P cells, where M, N, P, and K are integers greater than or equal to 1, K is less than or equal to N, and P is less than or equal to M.

In the foregoing method, for a scenario in which the M cells share the same RRU (namely, a co-power amplifier scenario), a method for reducing power consumption of the network device is proposed. The network device determines, based on delay sensitivity of the data of the N to-be-scheduled terminals in the M cells and the preset power threshold of each cell, data to be sent in the second time domain unit (for example, sends delay-sensitive data in the second time domain unit and delays sending delay-insensitive data), so that power-saving benefits of the network device can be improved.

In a possible design, the RRU includes a plurality of transmit channels; and that the network device sends the data of the K to-be-scheduled terminals in a second time domain unit of the P cells includes: The network device sends the data of the K to-be-scheduled terminals through some of the plurality of transmit channels based on a power bearing capability of the plurality of transmit channels and the power required for sending the delay-sensitive data in each of the P cells, and disables transmit channels in the plurality of transmit channels other than the some transmit channels.

In a possible design, a power for sending the data of the K to-be-scheduled terminals on each of the some transmit channels is W times a sum of powers required for sending the delay-sensitive data in all of the P cells; and a value of W is obtained based on a quantity of the some transmit channels.

In other words, when the network device sends the data of the K to-be-scheduled terminals, only some transmit channels are used. Therefore, the network device can increase a transmit power of each transmit channel, thereby effectively avoiding shrinking a coverage area.

In a possible design, the method further includes: If the network device determines that a power required for sending the delay-sensitive data in a first cell of the P cells is greater than a preset power threshold corresponding to the first cell, the network device sends the data of the N to-be-scheduled terminals in the second time domain unit of the M cells.

In a possible design, the method further includes: If the network device determines that all the data of the N to-be-scheduled terminals is delay-insensitive data, the network device stops sending data in the second time domain unit of the M cells.

In a possible design, that the network device stops sending data in the second time domain unit of the M cells includes: The network device disables, in the second time domain unit, a transmit channel corresponding to an idle symbol.

In this way, sending of the delay-insensitive data is delayed, and no data is sent in all second time domain units of the M cells, so that all transmit channels can be disabled in the second time domain units based on the symbol, thereby reducing power consumption.

In a possible design, the method further includes: The network device obtains a power required for sending data of each to-be-scheduled terminal in a cell in which the to-be-scheduled terminal is located.

The power required for sending the delay-sensitive data in each of the P cells is a sum of powers required for sending, in the cell, delay-sensitive data of one or more to-be-scheduled terminals in the cell.

According to a second aspect, an embodiment of this application provides an apparatus. The apparatus may be a network device, or may be a semiconductor chip disposed in a network device. The apparatus has a function of implementing various possible implementations of the first aspect. The function may be implemented by hardware, or may be implemented by hardware executing corresponding software. The hardware or software includes one or more units or modules corresponding to the foregoing function.

According to a third aspect, an embodiment of this application provides an apparatus. The apparatus includes a processor and a memory. The memory is configured to store computer-executable instructions. When the apparatus runs, the processor executes the computer-executable instructions stored in the memory, to enable the apparatus to perform the method according to the possible designs of the first aspect.

According to a fourth aspect, an embodiment of this application further provides a communications system. The communications system includes the network device according to any design of the first aspect, and may further include one or more terminals.

According to a fifth aspect, an embodiment of this application further provides a computer-readable storage medium. The computer-readable storage medium stores instructions. When the instructions are run on a computer, the computer is enabled to perform the method according to any one of the possible designs of the first aspect.

According to a sixth aspect, an embodiment of this application further provides a computer program product including instructions. When the computer program product runs on a computer, the computer is enabled to perform the method according to any one of the possible designs of the first aspect.

These aspects or other aspects of this application are clearer and easier to understand in descriptions of the following embodiments.

Figure 1A:
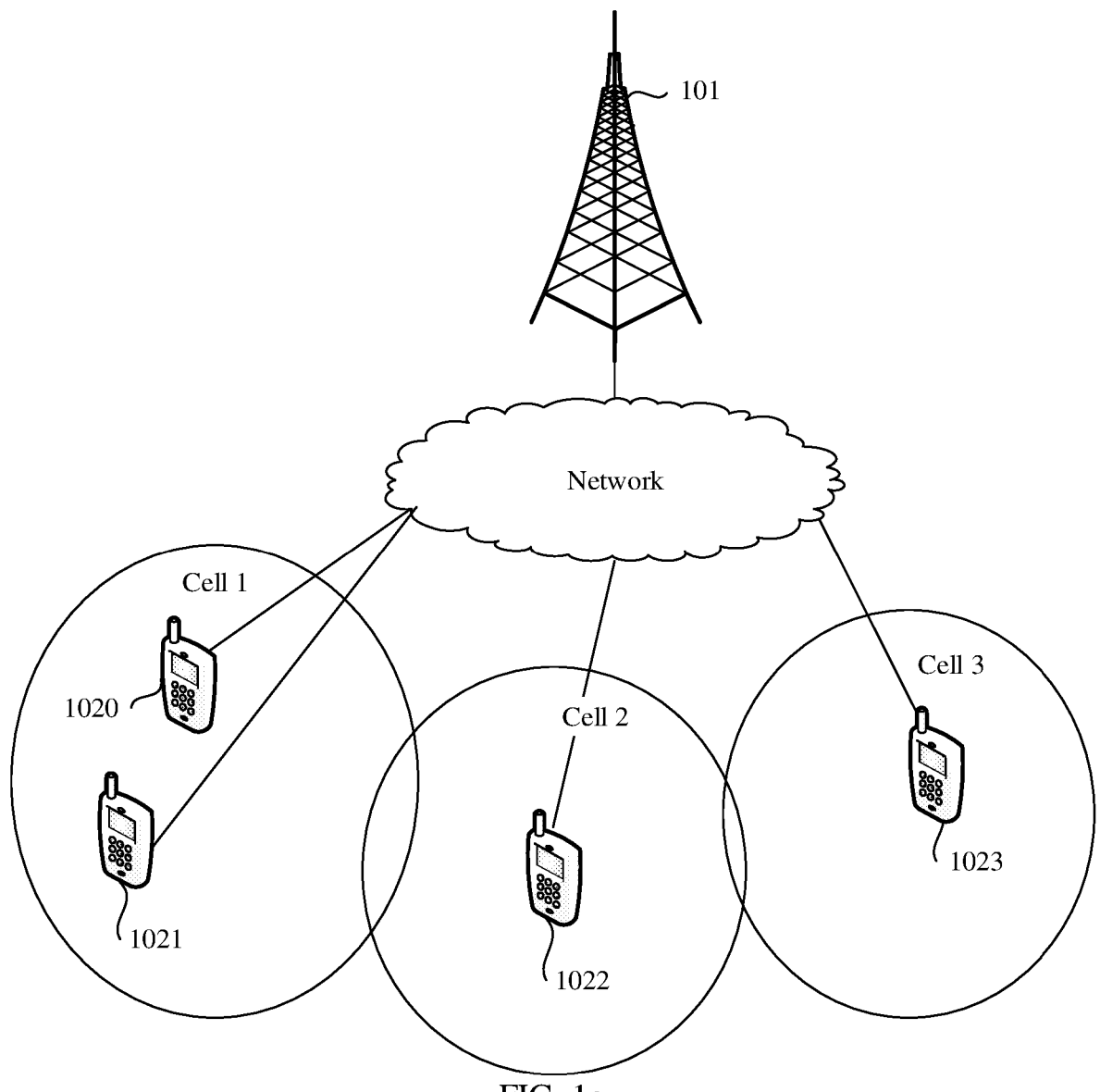
FIG. 1a is a schematic diagram of a system architecture to which an embodiment of this application is applicable.
Figure 1B:
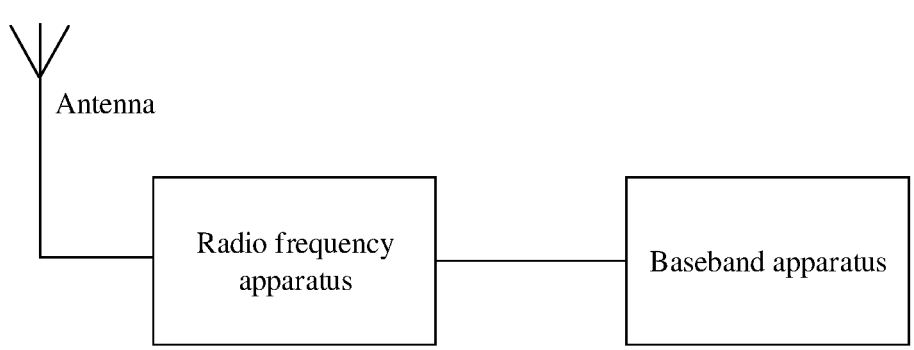
FIG. 1b is a schematic structural diagram of a network device according to an embodiment of this application.
Figure 1C:
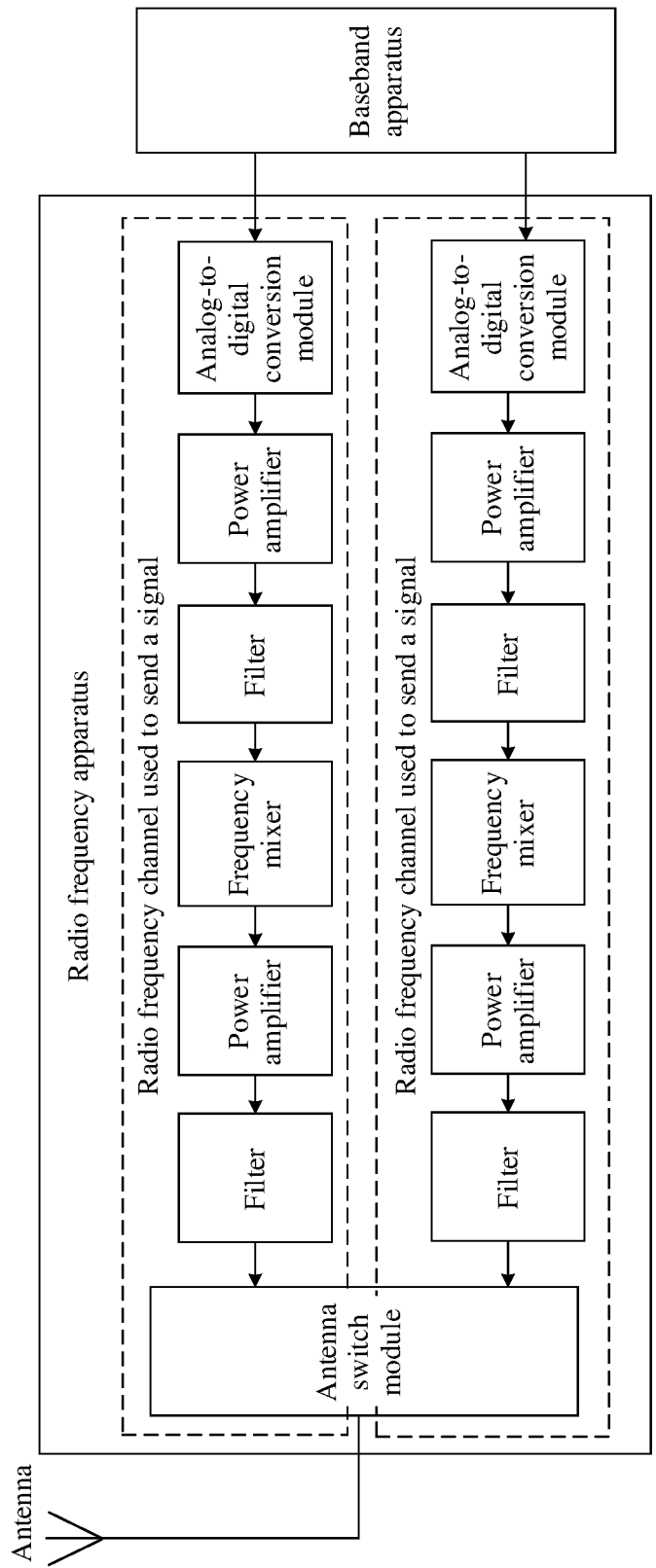
FIG. 1c is a schematic structural diagram of a radio frequency apparatus according to an embodiment of this application.
Figure 1D:
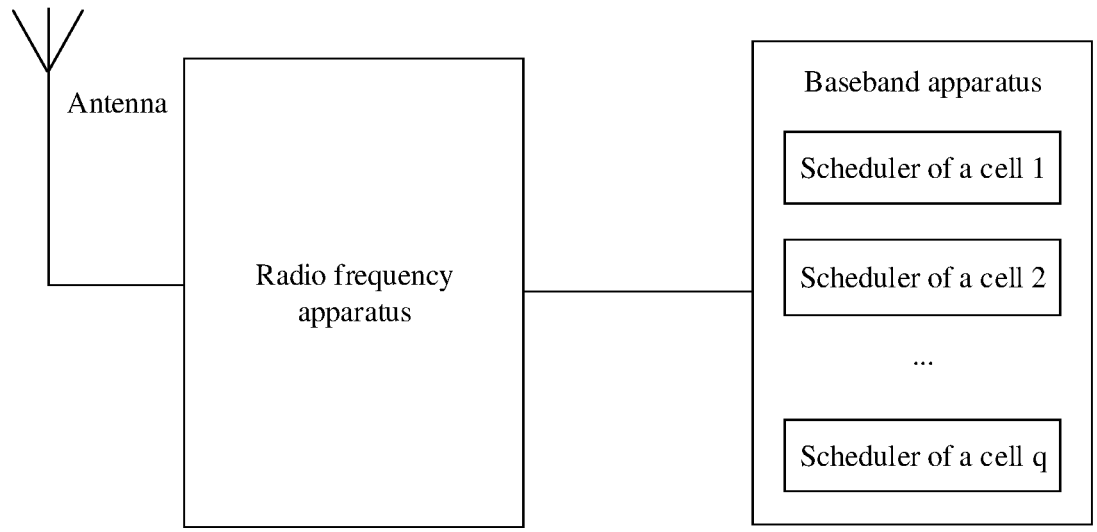
FIG. 1d is a schematic structural diagram of a baseband apparatus according to an embodiment of this application.
Figure 1E:
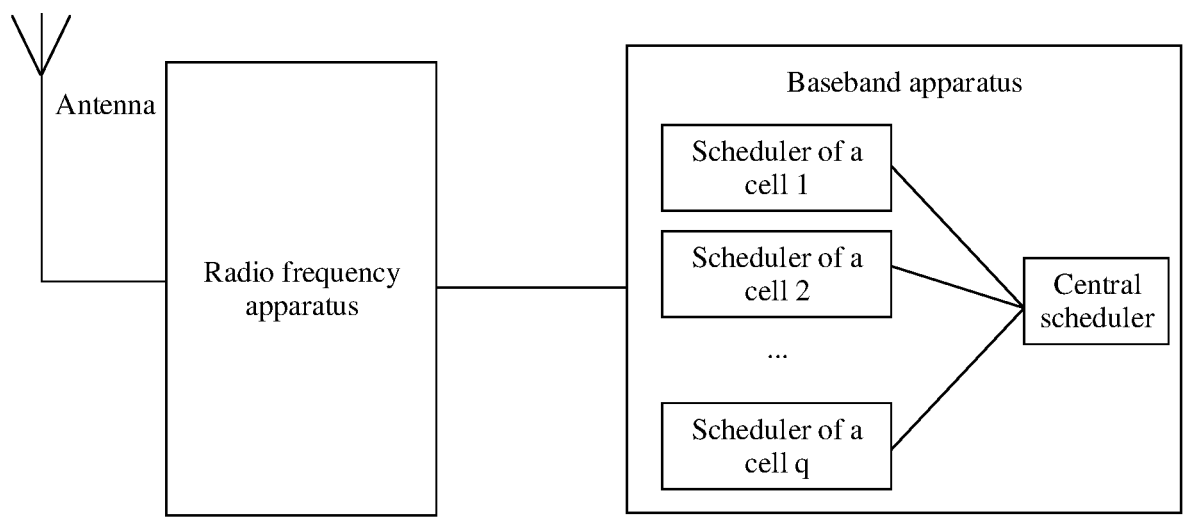
FIG. 1e is another schematic structural diagram of a baseband apparatus according to an embodiment of this application.
Figure 1F:
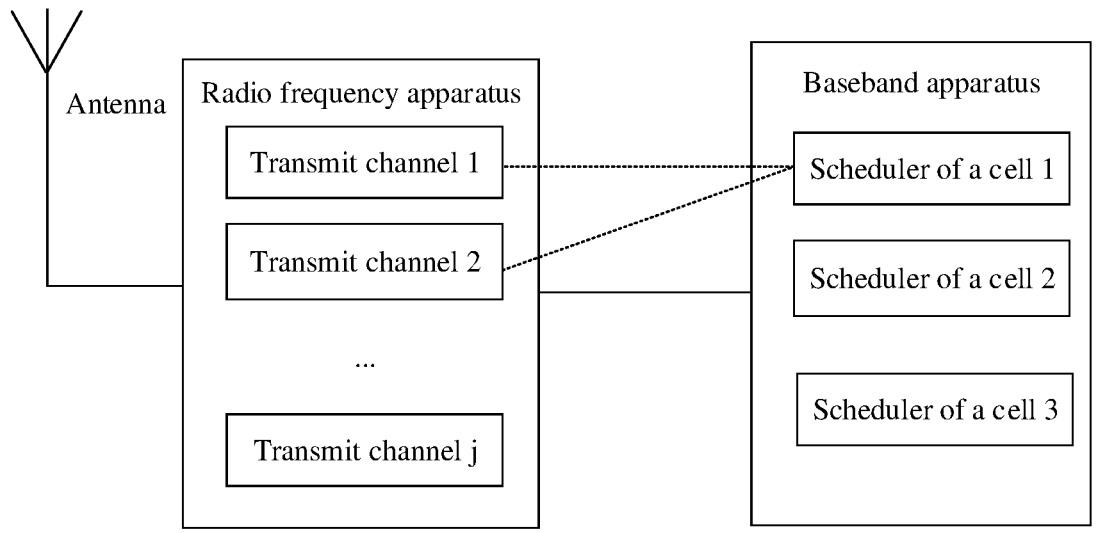
Figure 1G:
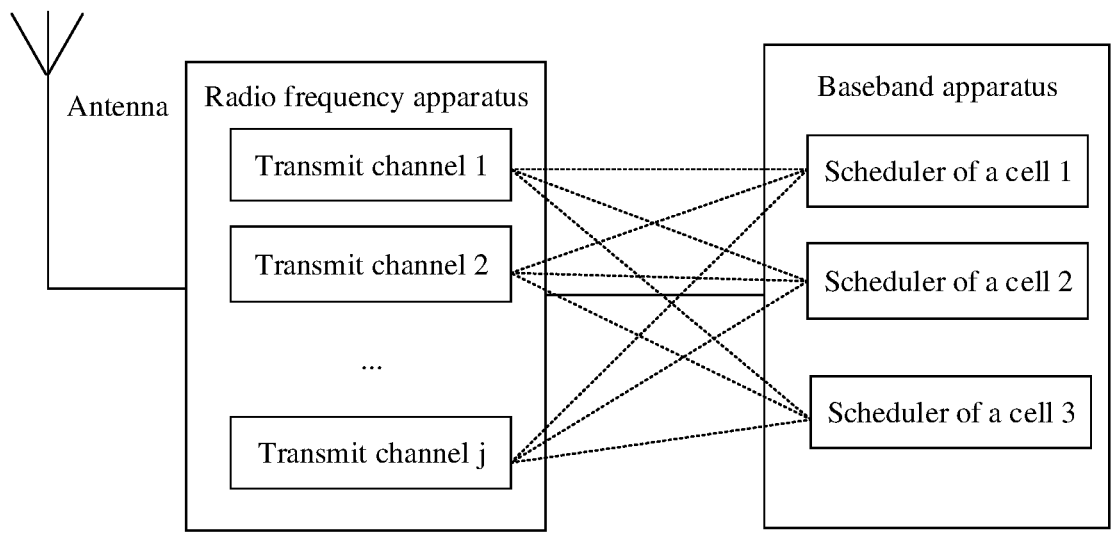
Figure 2:
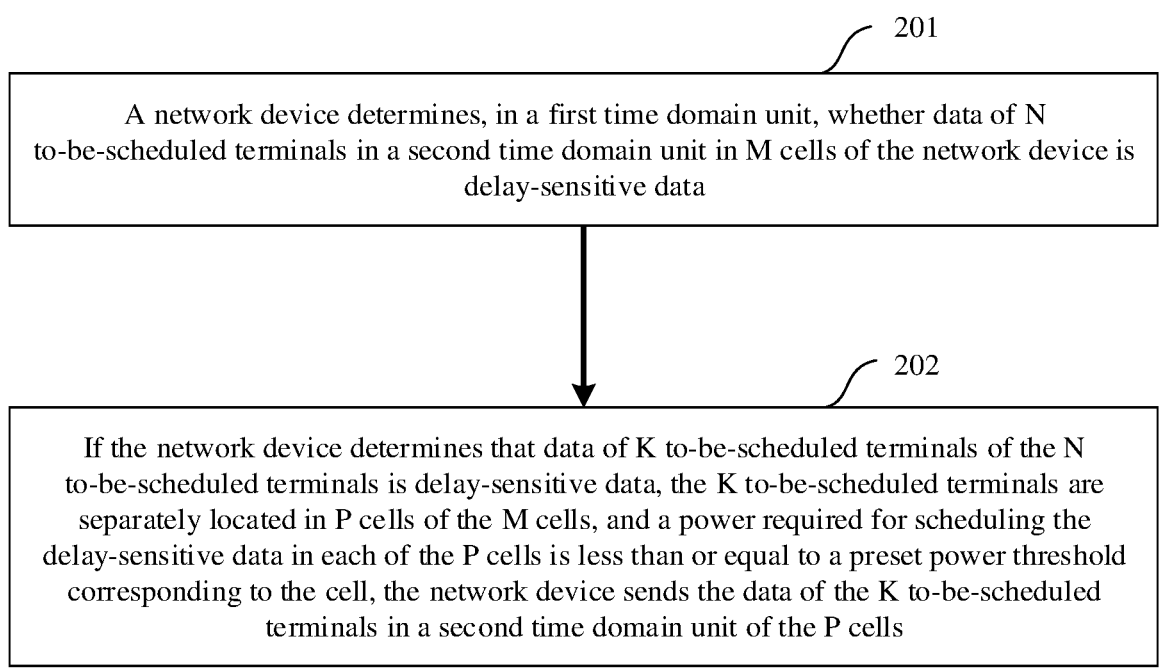
Figure 3:
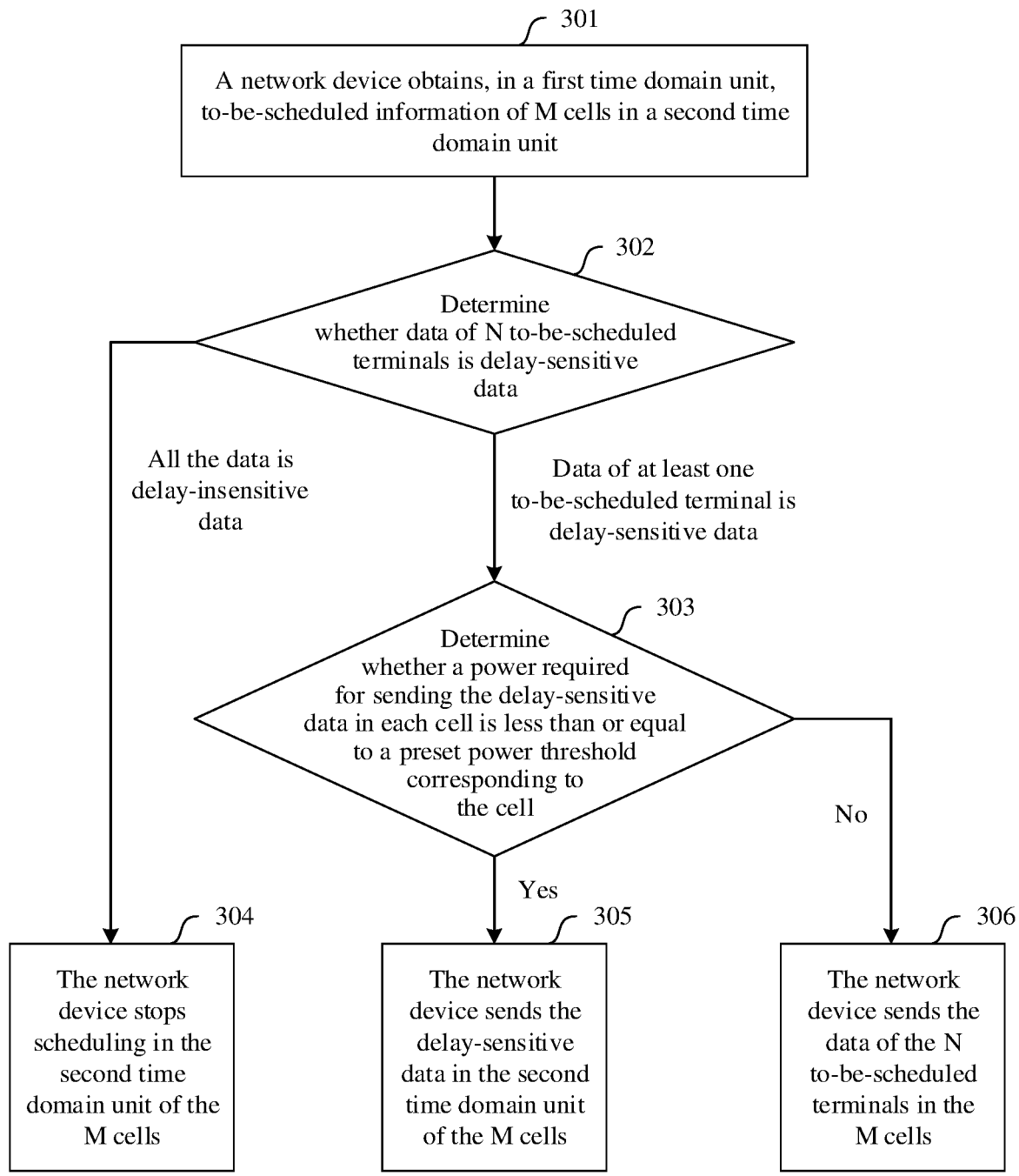
Figure 4:
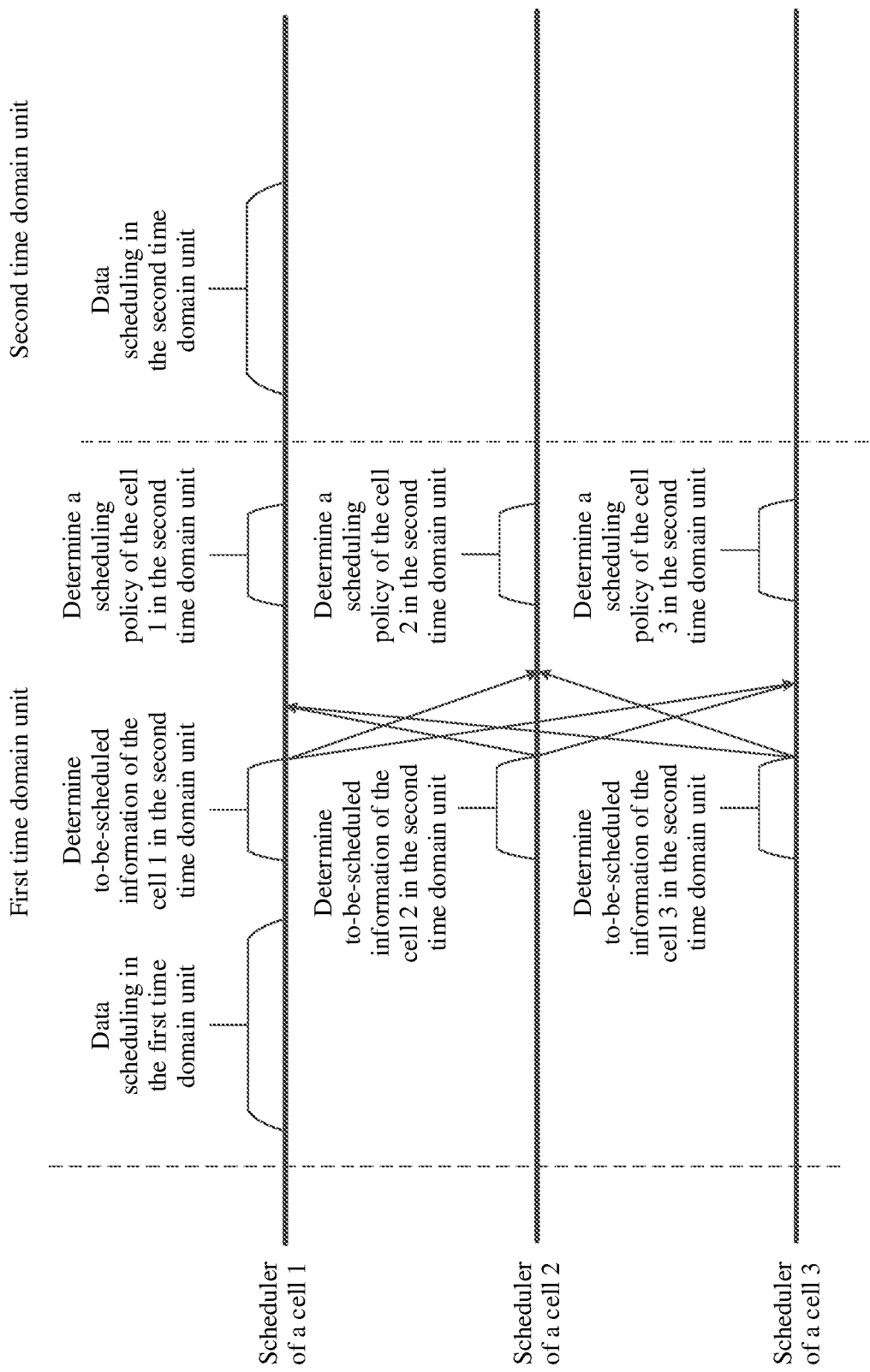
Figure 5:
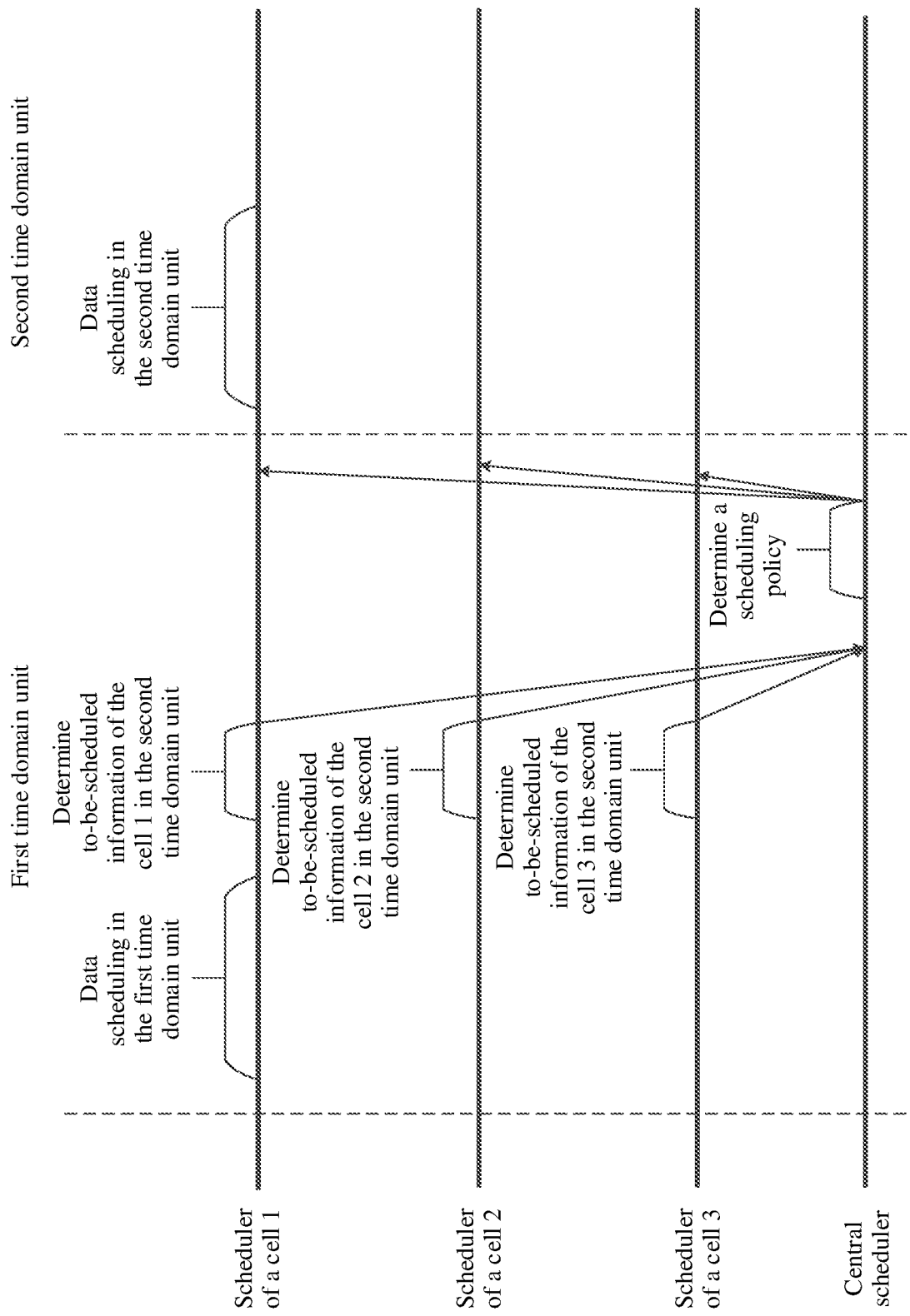
Figure 6:
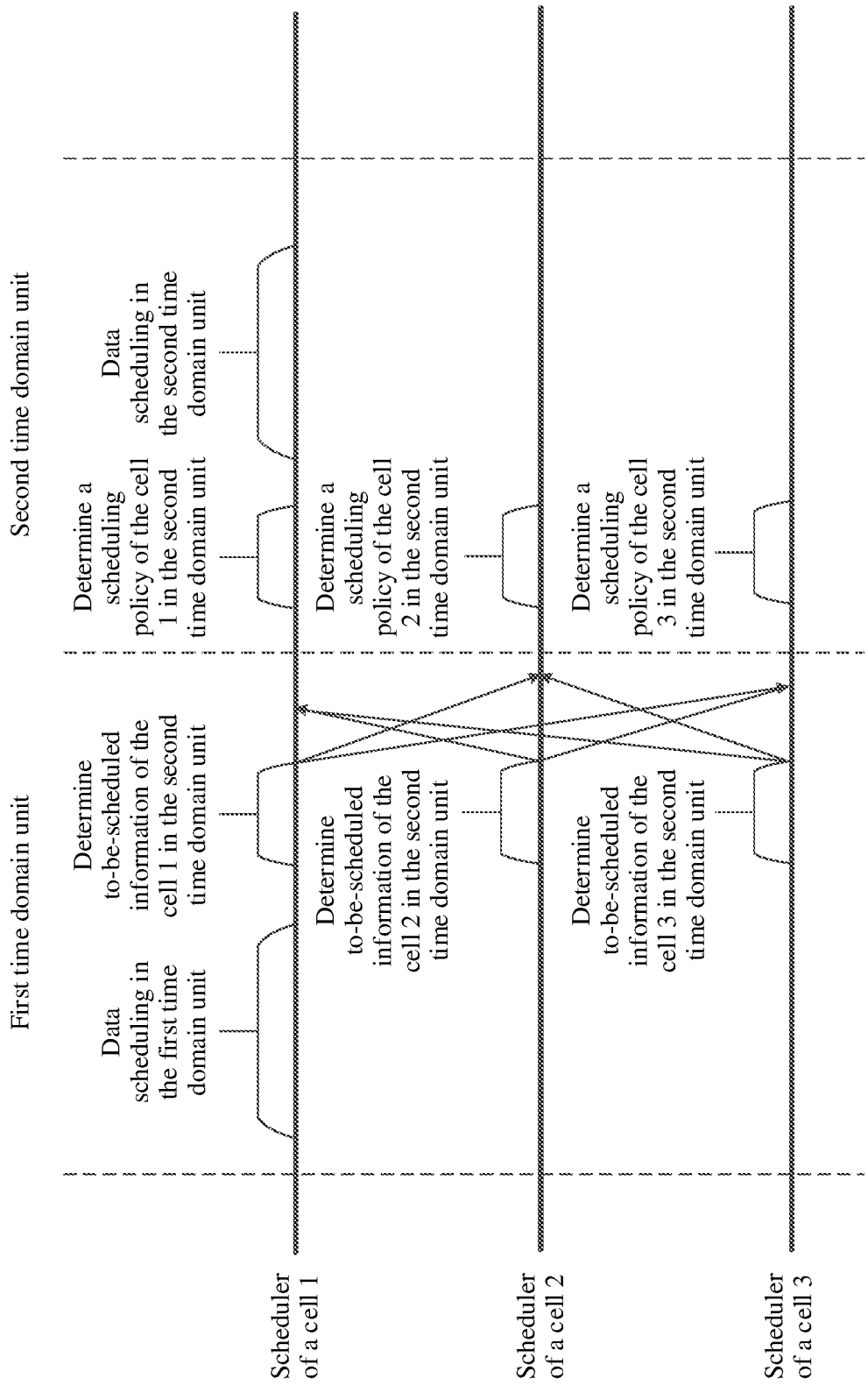
Figure 7:
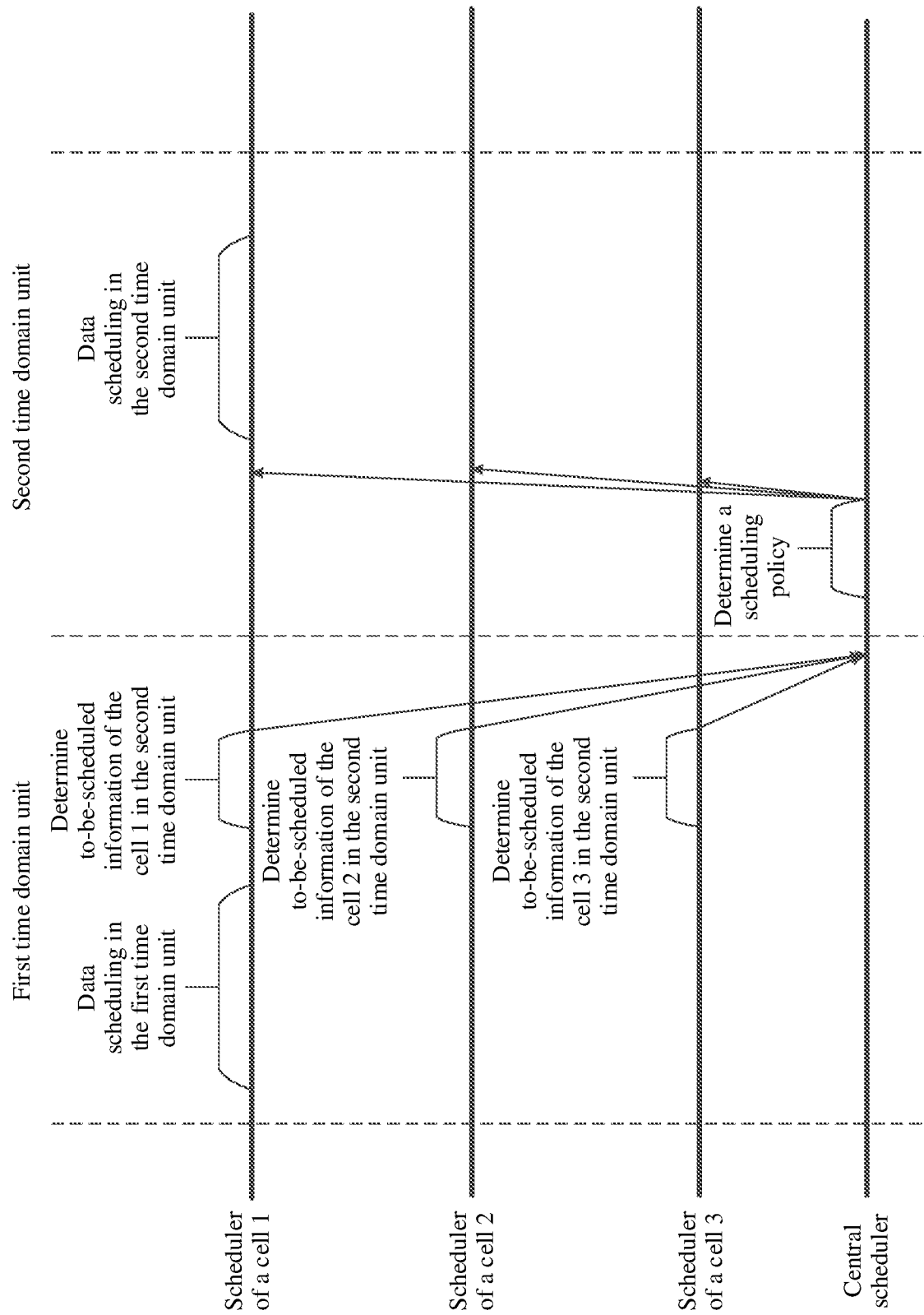
Figure 8:
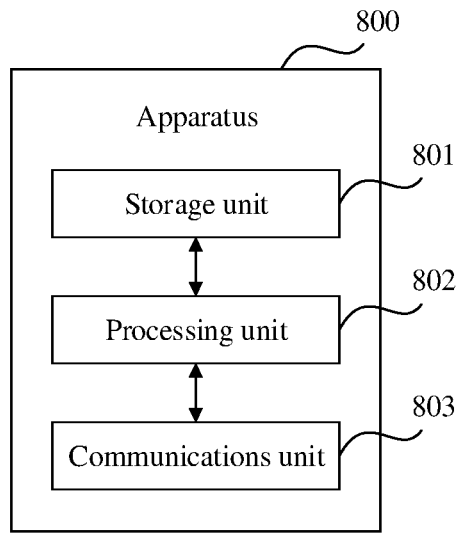
Figure 9:
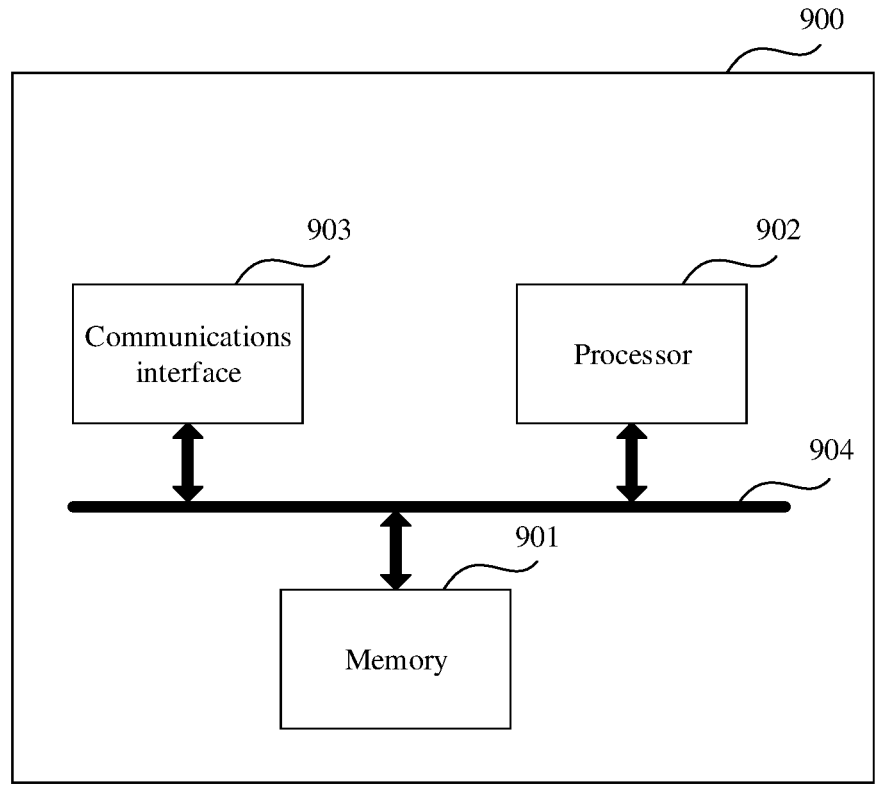

FIG. if is a schematic diagram of a possible scenario according to an embodiment of this application;

FIG. 1g is a schematic diagram of another possible scenario according to an embodiment of this application;

FIG. 2 is a schematic flowchart corresponding to a communication method according to an embodiment of this application;

FIG. 3 is an overall schematic flowchart of a communication method according to an embodiment of this application;

FIG. 4 is an example of an execution process based on FIG. 1d according to an embodiment of this application;

FIG. 5 is an example of an execution process based on FIG. 1e according to an embodiment of this application;

FIG. 6 is an example of another execution process based on FIG. 1d according to an embodiment of this application;

FIG. 7 is an example of another execution process based on FIG. 1e according to an embodiment of this application;

FIG. 8 is a possible example block diagram of an apparatus according to an embodiment of this application; and FIG. 9 is a schematic diagram of an apparatus according to an embodiment of this application.

DETAILED DESCRIPTION OF ILLUSTRATIVE EMBODIMENTS

To make the objectives, technical solutions, and advantages of this application clearer, the following further describes this application in detail with reference to the accompanying drawings.

Some terms in this application are first described, so as to help a person skilled in the art have a better understanding.

(1) Network device: The network device may be a device that communicates with a terminal, for example, a base station or a base station controller. The network device may provide communication coverage for a particular geographical area, and may communicate with a terminal device located in the coverage area (cell). The network device may be a base transceiver station (BTS) in a global system for mobile communications (GSM) system or a code division multiple access (CDMA) system, or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay node, an access point, a vehicle-mounted device, a wearable device, or a network device in a future 5G network, for example, a gNodeB (gNodeB or gNB) or a transmission reception point (TRP) in new radio (NR), or the network device may be a network device in a future evolved public land mobile network (PLMN) network. This is not limited in the embodiments of this application.

(2) Terminal (or terminal device): The terminal is a device that has a wireless transceiver function and may be deployed on land, including an indoor or outdoor device, a handheld device, a wearable device, or a vehicle-mounted device. It can also be deployed on the water surface (such as a ship) or in the air (for example, on aircraft, balloons, satellites, and the like). The terminal may be a mobile phone (mobile phone), a tablet computer (Pad), a computer with a wireless receiving/sending function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. Sometimes, the terminal may also be referred to as user equipment (UE), an access terminal, a UE unit, a UE station, a mobile station, a mobile console, a remote station, a remote terminal, a mobile device, a UE terminal, a terminal device, a wireless communications device, a UE agent, a UE apparatus, or the like.

(3) The first, second, and various numbers in the embodiments of this application are merely distinguished for convenient description, are not intended to limit the scope of the embodiments of this application, and do not indicate a sequence. The term "and/or" describes an association relationship for describing associated objects and represents that three relationships may exist. For example, A and/or B may represent the following three cases: Only A exists, both A and B exist, and only B exists. "At least one" means one or more. The at least two means two or more. "At least one", "any one", or a similar expression thereof means any combination of these items, including a singular item (piece) or any combination of plural items (pieces). For example, at least one (piece, or type) of a, b, or c may indicate: a, b, c, a-b, a-c, b-c, or a-b-c, where a, b, and c may be singular or plural.

A system architecture shown in FIG. 1a includes a network device (for example, a network device 101) and a terminal (for example, a terminal 1020, a terminal 1021, a terminal 1022, and a terminal 1023). It should be understood that FIG. 1a is merely a simple schematic diagram of a system architecture. A quantity of network devices and a quantity of terminals in the system architecture are not limited in this embodiment of this application. In addition to the network device and the terminal, the system architecture to which this embodiment of this application is applicable may further include another device such as a core network device, a wireless relay device, or a wireless backhaul device. This is not limited in this embodiment of this application either. In addition, the network device in this embodiment of this application may integrate all functions into one independent physical device, or may distribute the functions on a plurality of independent physical devices. This is not limited in this embodiment of this application either. In addition, the terminal in this embodiment of this application may be connected to the network device in a wireless manner.

A communications system to which the foregoing system architecture is applicable includes but is not limited to: time division duplexing-long term evolution (TDD LTE), frequency division duplexing-long term evolution (FDD LTE), long term evolution-advanced (LTE-A), and various future evolved wireless communications systems, for example, a 5G NR communications system.

The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the communications system architecture and the emergence of new service scenarios, the technical solutions provided in the embodiments of this application are also applicable to similar technical problems.

In the system architecture shown in FIG. 1a, the network device may include a baseband apparatus and a radio frequency apparatus. FIG. 1b is a schematic structural diagram of the network device. The radio frequency apparatus may be independently implemented remotely from the baseband apparatus, or may be integrated into the baseband apparatus, or some remote parts are integrated into the baseband apparatus. For example, in a long term evolution (LTE) communications system, a network device (eNB) includes a baseband apparatus and a radio frequency apparatus. The radio frequency apparatus may be remotely disposed relative to the baseband apparatus. For example, a remote radio unit (RRU) is remotely disposed relative to a baseband unit (BBU).

The radio frequency apparatus may include one or more radio frequency channels (which may be referred to as receive channels) for receiving a radio frequency signal and one or more radio frequency channels (which may be referred to as transmit channels) for sending a radio frequency signal. The transmit channel is used as an example. FIG. 1c is shows two transmit channels in a remote radio unit. Each transmit channel may successively include an analog-to-digital conversion module, a power amplifier, a filter, a frequency mixer, a power amplifier, a filter, and an antenna switch module. That is, a signal generated by the baseband apparatus is transmitted to an antenna and transmitted after successively passing through the analog-to-digital conversion module, the power amplifier, the filter, the frequency mixer, the power amplifier, the filter, and the antenna switch module.

It should be noted that FIG. 1c is shows only two radio frequency channels that are selected by the antenna switch module and that are used to send a signal. During actual implementation, a quantity of radio frequency channels used to send a signal in the radio frequency apparatus is not specifically limited in this embodiment of this application. For example, there may be one, two, or four radio frequency channels. In addition, FIG. 1c shows only the radio frequency channel used to send a signal. In actual application, the radio frequency apparatus further includes a radio frequency channel used to receive a signal. In addition, the radio frequency channel of the radio frequency apparatus may not include the analog-to-digital conversion module shown in FIG. 1c. In this case, the analog-to-digital conversion module may be integrated in the baseband apparatus. The radio frequency channel shown in FIG. 1c is merely a specific example, and a physical structure of the radio frequency channel is not strictly limited in this embodiment of this application. In addition, during specific implementation, a plurality of radio frequency channels may share some devices. For example, two radio frequency channels may share one filter or frequency mixer. This is not specifically limited in this embodiment of this application.

In an example, the baseband apparatus may include a scheduler of each cell of the network device, for example, a scheduler of a cell 1, a scheduler of a cell 2, . . . , and a scheduler of a cell q, as shown in FIG. 1d. Any two schedulers in the scheduler of the cell 1, the scheduler of the cell 2, . . . , and the scheduler of the cell q may communicate with each other. In another example, the baseband apparatus may include a scheduler of each cell of the network device and a central scheduler, for example, a scheduler of a cell 1, a scheduler of a cell 2, . . . , and a scheduler of a cell q and the central scheduler, as shown in FIG. 1e. Any two schedulers in the scheduler of the cell 1, the scheduler of the cell 2, . . . , and the scheduler of the cell q may communicate with each other, and each of the scheduler of the cell 1, the scheduler of the cell 2, . . . , and the scheduler of the cell q may communicate with the central scheduler. The following mainly uses the case shown in FIG. 1d as an example for description.

In this embodiment of this application, a scheduler of each cell may be configured to complete data scheduling of the cell, for example, sending data or receiving data. This is not specifically limited. The central scheduler may be configured to coordinate data scheduling of each cell. This is not specifically limited.

In the system architecture shown in FIG. 1a, the network device 101 is configured with three cells: a cell 1, a cell 2, and a cell 3. The terminal 1020 and the terminal 1021 are located in the cell 1, the terminal 1022 is located in the cell 2, and the terminal 1023 is located in the cell 3.

In a possible scenario, for each cell, a radio frequency channel corresponding to the cell exists in the radio frequency apparatus. When the radio frequency channel is gated, the radio frequency channel may be used to transmit a signal of the cell. Herein, it may also be understood as follows: For each cell, there is a group of radio frequency channel parameters corresponding to the cell in the network device. The group of radio frequency channel parameters may be software configuration parameters of some modules in the radio frequency channel shown in FIG. 1c. For example, the radio frequency channel parameter may be understood as a gating parameter of the antenna switch module, or may be understood as a power-on parameter or an enabling parameter of a device such as the filter, the frequency mixer, or the power amplifier, or may be understood as another parameter of a device such as the filter, the frequency mixer, or the power amplifier. After the radio frequency channel is configured by using the radio frequency channel parameter corresponding to the cell, the radio frequency channel may be gated, so as to transmit the signal of the cell. In this scenario, after the radio frequency channel is gated, the radio frequency channel is used to transmit a signal of only one cell. As shown in FIG. if, two transmit channels in the radio frequency apparatus are selected to transmit a signal of the cell 1. In this way, in a subframe of the cell, the network device may dynamically detect symbols on which no data is sent, and disable a transmit channel corresponding to the symbol on which no data is sent, thereby reducing power consumption of the network device.

In another possible scenario, a plurality of cells of the network device may share a same RRU. Further, the plurality of cells may share a radio frequency channel in the RRU, in other words, the plurality of cells share a power amplifier in the RRU. In this case, after the radio frequency channel is selected, the radio frequency channel may be used to transmit signals of a plurality of cells. For example, the cell 1, the cell 2, and the cell 3 share the radio frequency channel in the RRU. In a subframe, if the cell 1 needs to send data a to the terminal 1020, a cell b needs to send data b to the terminal 1022, and a cell c needs to send data c to the terminal 1023, as shown in FIG. 1g, each of j transmit channels included in the radio frequency apparatus sends the data a, the data b, and the data c. In this scenario, one transmit channel may be used to transmit signals of a plurality of cells. Therefore, symbol power saving can be performed only when the plurality of cells have no data to send in a same subframe. Consequently, an effective proportion of symbol power saving is relatively low, and power-saving benefits of the network device is relatively low. It should be noted that, that the cell sends data to the terminal in this embodiment of this application may mean that the network device sends the data to the terminal in the cell, and the two cases may replace each other.

Based on this, an embodiment of this application provides a communication method, to improve power-saving benefits of the network device.

Embodiment 1

FIG. 2 is a schematic flowchart corresponding to a communication method according to an embodiment of this application. As shown in FIG. 2, the method includes the following steps.

Step 201: A network device determines, in a first time domain unit, whether data of N to-be-scheduled terminals in a second time domain unit in M cells of the network device is delay-sensitive data.

Herein, a time domain unit may be a transmission time interval (TTI). In an example, duration of the TTI may be duration of one subframe, namely, 1 ms. The first time domain unit may be located before the second time domain unit. In an example, the first time domain unit may be a time domain unit that is adjacent to the second time domain unit and that is earlier than the second time domain unit. For example, if the first time domain unit is an $n^{th}$ time domain unit, the second time domain unit may be an $(n+1)^{th}$ time domain unit. Alternatively, the first time domain unit and the second time domain unit may be a same time domain unit. The following provides descriptions only by using an example in which the first time domain unit is located before the twentieth unit.

For example, M=3, and three cells of the network device may share a same RRU. In an example (an example 1 for short), the network device may be configured with three cells, and the three cells are configured to share a same RRU. In another example (an example 2 for short), the network device may also be configured with a plurality of (more than 3) cells, and three of the plurality of cells are configured to share a same RRU. This is not specifically limited in this embodiment of this application. The following uses only the case described in the example 1 as an example for description.

In this embodiment of this application, the network device may obtain to-be-scheduled information of the M cells in the second time domain unit, where the to-be-scheduled information of the M cells in the second time domain unit may include delay attribute information of the data of the N to-be-scheduled terminals of the M cells in the second time domain unit. Delay attribute information of data of each to-be-scheduled terminal of the N to-be-scheduled terminals is used to indicate whether the data of each to-be-scheduled terminal is delay-sensitive data. In this way, the network device may determine, based on the delay attribute information of the data of the N to-be-scheduled terminals, whether the data of the N to-be-scheduled terminals is delay-sensitive data. Optionally, the to-be-scheduled information may further include a power required for sending data of each to-be-scheduled terminal in a cell in which the to-be-scheduled terminal of the N to-be-scheduled terminals is located. It may be understood that in another possible example, the to-be-scheduled information may further include other content. This is not specifically limited.

The following describes the to-be-scheduled information by using an example in which the to-be-scheduled information includes the delay attribute information of the data of each to-be-scheduled terminal of the N to-be-scheduled terminals and the power required for sending the data of each to-be-scheduled terminal in the cell in which the to-be-scheduled terminal is located.

(1) Delay Attribute Information of the Data of the to-be-Scheduled Terminal

The network device may determine, based on the delay attribute information of the data of the to-be-scheduled terminal, whether the data of the to-be-scheduled terminal is delay-sensitive data. In this embodiment of this application, the delay-sensitive data may be data that needs to be sent in the second time domain unit, and delay-insensitive data may be data that does not need to be sent in the second time domain unit, in other words, data that may be sent in a time domain unit after the second time domain unit.

In an example, the delay attribute information of the to-be-scheduled terminal may include a quality of service class identifier (QCI) of the data of the to-be-scheduled terminal, and optionally may further include a delay time of the data of the to-be-scheduled terminal.

As shown in Table 1, QCIs range from 1 to 9, and separately correspond to different resource types, different priorities, different delays, and different packet loss rates.

TABLE 1

Example of the QCI

| QCI | Type | Priority | Data packet delay budget | Packet error rate |
|---|---|---|---|---|
| 1 | GBR | 2 | 100 ms | $10^{-2}$ |
| 2 |  | 4 | 150 ms | $10^{-3}$ |
| 3 |  | 3 | 50 ms | $10^{-3}$ |
| 4 |  | 5 | 300 ms | $10^{-6}$ |
| 5 | Non-GBR | 1 | 100 ms | $10^{-6}$ |
| 6 |  | 6 | 300 ms | $10^{-6}$ |
| 7 |  | 7 | 100 ms | $10^{-3}$ |
| 8 |  | 8 | 300 ms | $10^{-6}$ |
| 9 |  | 9 | 300 ms | $10^{-6}$ |

It can be learned from Table 1 that services may be mainly classified into two types: a GBR (Guaranteed Bit Rate) type and a non-GBR (Non-Guaranteed Bit Rate) type. A GBR-type service, such as a conversational video service, has a relatively strict requirement on a delay, and allows a relatively high packet loss rate. A non-GBR-type service, such as a web browsing service or a file download service, has a relatively strict requirement on information integrity, and does not allow a relatively high packet loss rate. For example, if the network device determines that to-be-sent data belongs to a GBR-type service whose QCI is 1 to 4 or a non-GBR-type service whose QCI is 5, the network device may determine that the data of the to-be-scheduled terminal is delay-sensitive data. If the network device determines that the data of the to-be-scheduled terminal belongs to a non-GBR-type service whose QCI is 6 to 9, and the delay time is less than a delay time threshold, the network device may determine that the data of the to-be-scheduled terminal is delay-insensitive data. If the network device determines that the data of the to-be-scheduled terminal belongs to a non-GBR-type service whose QCI is 6 to 9, and the delay time is greater than or equal to the delay time threshold, the network device may determine that the data of the to-be-scheduled terminal is delay-sensitive data. That is, the delay time threshold may be set for the data of the non-GBR-type service whose QCI is 6 to 9. When the delay time is greater than or equal to the delay time threshold, the data is delay-sensitive data, so as to avoid an excessive delay.

The delay time threshold may be set by a person skilled in the art according to an actual requirement, and is not specifically limited. For example, different delay time thresholds may be set for data of non-GBR-type services with different QCIs (6 to 9). For example, for the non-GBR-type service whose QCI is 6, the delay time threshold is x1 time domain units; and for the non-GBR-type service whose QCI is 7, the delay time threshold is x2 (not equal to x1) time domain units. Alternatively, a same delay time threshold may be set for data of non-GBR-type services with different QCIs (6 to 9). This is not limited in this embodiment of this application.

For example, data of a terminal a belongs to the non-GBR-type service whose QCI is 6, the delay time of the data is one time domain unit, and the delay time threshold of the data of the non-GBR-type service whose QCI is 6 is one time domain unit, so that the data of the terminal a is delay-sensitive data. For another example, data of a terminal b belongs to the non-GBR-type service whose QCI is 7, the delay time of the data is two time domain units, and the delay time threshold of the data of the non-GBR-type service whose QCI is 7 is two time domain units, so that the data of the terminal b is delay-insensitive data, in other words, the data of the terminal b does not need to be sent in the second time domain unit. Further, if the data of the terminal b is not sent in the second time domain unit (for example, an $(n+1)^{th}$ time domain unit), the delay time of the data of the terminal b is one time domain unit (that is, the data of the terminal b in an $(n+2)^{th}$ time domain unit is still delay-insensitive data, in other words, the data of the terminal b does not need to be sent in the $(n+2)^{th}$ time domain unit). If the data of the terminal b is still not sent in a time domain unit (the $(n+2)^{th}$ time domain unit) after the second time domain unit, the delay time of the data of the terminal b is two time domain units, and the data of the terminal b becomes delay-sensitive data in an $(n+_3)^{th}$ time domain unit, in other words, the data of the terminal b needs to be sent in the $(n+_3)^{th}$ time domain unit.

(2) Power Required for Sending Data of Each to-be-Scheduled Terminal in a Cell in which the to-be-Scheduled Terminal is Located The network device may determine, based on data buffer information and channel information of each to-be-scheduled terminal, the power required for sending the data of each to-be-scheduled terminal in the cell in which the to-be-scheduled terminal is located. The data buffer information of each to-be-scheduled terminal may include a data amount of each to-be-scheduled terminal, and the channel information may include channel quality information. Optionally, the channel information may further include other information (for example, a channel type). In this embodiment of this application, only an example in which the channel information includes the channel quality information is used for description.

In this embodiment of this application, the network device may obtain the data buffer information and the channel information of the to-be-scheduled terminal in a plurality of specific implementations. In a possible implementation, a terminal may report data buffer information and channel information of the terminal to the network device. For example, the network device may send a reference signal to a terminal located in a coverage area of the network device (that is, located in a coverage area of the M cells). Correspondingly, the terminal may determine channel quality information based on the reference signal and report the channel quality information to the network device. The reference signal may be used to perform channel measurement or channel quality estimation. In an example, the reference signal may be a cell-specific reference signal (CRS), a demodulation reference signal (DMRS), a channel state information-reference signal (CSI-RS), or the like. This is not specifically limited. The channel quality information determined by the terminal based on the reference signal may include any one or any combination of the following: a reference signal received power (RSRP), reference signal received quality (RSRQ), and a channel quality indication (CQI). In another possible embodiment, the channel quality information may further include other content. This is not specifically limited. The following uses an example in which the channel quality information is the CQI for description.

For example, M=3, and the three cells are a cell 1, a cell 2, and a cell 3. N=4, and the four to-be-scheduled terminals are a terminal a, a terminal b, a terminal c, and a terminal d. The terminal a and the terminal b are located in the cell 1, the terminal b is located in the cell 2, and the terminal c is located in the cell 3. Data buffer information and channel information of each to-be-scheduled terminal are listed in Table 2.

TABLE 2

Data buffer information and channel information of each to-be-scheduled terminal

| Identifier of the to-be-scheduled terminal | Data amount (unit: byte) | CQI |
| --- | --- | --- |
| Terminal a | A | * |
| Terminal b | B | * |
| Terminal c | C | * |
| Terminal d | D | * |

There may also be a plurality of specific implementations in which the network device determines, based on the data buffer information and the channel information of each to-be-scheduled terminal, the power required for sending the data of each to-be-scheduled terminal in the cell in which the to-be-scheduled terminal is located. In a possible implementation, for a terminal (for example, the terminal a), a CQI usually has 1 to 15 values, and different values correspond to different modulation and coding schemes (MCS). The network device may obtain, based on an MCS corresponding to a CQI reported by the terminal a, an amount (for example, denoted as TBSize) of data that can be transmitted in a resource block (resource block, RB), and then obtain, based on an amount (for example, denoted as X) of data of the terminal a, a quantity (X/TBSize) of RBs required for sending the data of the terminal a, to further obtain a power required for sending the data of the terminal a being Po* (X/TBSize).

For example, the power that is required for sending the data of each to-be-scheduled terminal in the cell in which the to-be-scheduled terminal is located and that is determined by the network device is listed in Table 3.

TABLE 3

Example of the power

| Identifier of the to-be-scheduled terminal | Required power |
| --- | --- |
| Terminal a | 10 W |
| Terminal b | 20 W |
| Terminal c | 10 W |
| Terminal d | 20 W |

Step 202: If the network device determines that data of K to-be-scheduled terminals of the N to-be-scheduled terminals is delay-sensitive data, the K to-be-scheduled terminals are separately located in P cells of the M cells, and a power required for sending the delay-sensitive data in each of the P cells is less than or equal to a preset power threshold corresponding to the cell, the network device sends the data of the K to-be-scheduled terminals in a second time domain unit of the P cells.

M, N, P, and K are integers greater than or equal to 1, K is less than or equal to N, and P is less than or equal to M.

In an example, based on the descriptions in step 201, the network device obtains the information listed in Table 4 based on the to-be-scheduled information of the M cells in the second time domain unit.

TABLE 4

Example of information obtained by the network device

| Identifier of the to-be-scheduled terminal | Required power | Delay attribute of terminal data |
| --- | --- | --- |
| Terminal a | 10 W | Delay-sensitive |
| Terminal b | 20 W | Delay-insensitive |
| Terminal c | 10 W | Delay-sensitive |
| Terminal d | 20 W | Delay-insensitive |

It can be learned from Table 4 that data of the terminal a and the terminal c is delay-sensitive data, and data of the terminal b and the terminal d is delay-insensitive data. The K to-be-scheduled terminals are the terminal a and the terminal c, and the P cells are a cell 1 in which the terminal a is located and a cell 2 in which the terminal c is located. A power required by the cell 1 to send delay-sensitive data (namely, the data of the terminal a) is 10 W, and a power required by the cell 2 to send delay-sensitive data (namely, the data of the terminal c) is 10 W.

It should be noted that a power required for sending delay-sensitive data in a cell (for example, the cell a) is a sum of powers required for sending, in the cell, delay-sensitive data of one or more to-be-scheduled terminals in the cell. For example, when the cell a includes a to-be-scheduled terminal e and a to-be-scheduled terminal f (where data of the to-be-scheduled terminal e and data of the to-be-scheduled terminal f are both delay-sensitive data, and a power required for sending the data of the to-be-scheduled terminal e and a power required for sending the data of the to-be-scheduled terminal f in the cell a are respectively 10 W and 20 W), the power required for sending delay-sensitive data in the cell a is 30 W (10 W+20 W).

The following describes a preset power threshold corresponding to each cell.

It is assumed that a radio frequency apparatus of the network device has g (for example, g=8) transmit channels, and a power bearing capacity of each transmit channel is 100 W. A maximum transmit power corresponding to the cell 1 is 30 W, a maximum transmit power corresponding to the cell 2 is 40 W, and a maximum transmit power corresponding to the cell 3 is 30 W. In an example, if a quantity of disabled transmit channels is m when data is sent in the second time domain unit, and a quantity of transmit channels used to send data is n (m+n=g), a preset power threshold corresponding to the cell 1 may be n/g*30 W, a preset power threshold corresponding to the cell 2 may be n/g*40 W, and a preset power threshold corresponding to the cell 3 may be n/g*30 W. It can be learned that there may be a plurality of possible values of the preset power threshold corresponding to each cell based on the quantity of transmit channels used to send data.

Using eight transmit channels as an example, when ½ transmit channels (that is, four transmit channels) are disabled, the preset power threshold corresponding to the cell 1 may be ½*30 W=15 W, the preset power threshold corresponding to the cell 2 may be ½*40 W=20 W, and the preset power threshold corresponding to the cell 3 may be ½*30 W=15 W. When ¾ transmit channels (that is, six transmit channels) are disabled, the preset power threshold corresponding to the cell 1 may be ¼*30 W=7.5 W, the preset power threshold corresponding to the cell 2 may be ¼*40 W=10 W, and the preset power threshold corresponding to the cell 3 may be ¼*30 W=7.5 W. As shown in FIG. 5.

TABLE 5

Schematic diagram of a preset power threshold corresponding to the cell

| Quantity of transmit channels for sending data | Preset power threshold corresponding to the cell 1 | Preset power threshold corresponding to the cell 2 | Preset power threshold corresponding to the cell 3 |
|---|---|---|---|
| 4 | 15 | 20 | 15 |
| 2 | 7.5 | 10 | 7.5 |

A power required for sending delay-sensitive data in the cell 1 is 10 W (less than 15 W), and a power required for sending delay-sensitive data in the cell 2 is 10 W (less than 20 W). That is, the power required for sending the delay-sensitive data in each of the P cells is less than or equal to the preset power threshold corresponding to each cell. Therefore, the network device may send the data of the K to-be-scheduled terminals in the second time domain units of the P cells. Optionally, the network device may not send delay-insensitive data in the second time domain unit.

Further, in the foregoing determining, the power required for sending the delay-sensitive data in each cell is compared with the preset power threshold corresponding to each cell when the quantity of transmit channels used to send the data is 4. Therefore, when the network device sends the data of the K to-be-scheduled terminals in the second time domain units of the P cells, the network device may send the data of the K to-be-scheduled terminals through some transmit channels (that is, four transmit channels) of a plurality of transmit channels based on a power bearing capacity of the plurality of transmit channels and the power required for sending the delay-sensitive data in each of the P cells, and disable transmit channels in the plurality of transmit channels other than the some transmit channels (that is, disable four transmit channels).

In this embodiment of this application, a power for sending the data of the K to-be-scheduled terminals on each of the four transmit channels may be W times a sum of powers required for sending the delay-sensitive data in all of the P cells. A value of W is obtained based on a quantity of the some transmit channels. For example, if the quantity of the some transmit channels in the foregoing example is 4, the value of W may be g/n=2. In the foregoing example, the sum of the power required for sending the delay-sensitive data in all of the P cells is 10+10=20 W. Therefore, the power for sending the data of the K to-be-scheduled terminals on each transmit channel is 2*20 W=40 W. In other words, when the network device sends the data of the K to-be-scheduled terminals, only some transmit channels are used. Therefore, the network device can increase a transmit power of each transmit channel, thereby effectively avoiding shrinking a coverage area.

It should be noted that, in the foregoing example, because the power required for sending the delay-sensitive data in the cell 1 is 10 W (greater than 7.5 W), that is, the power required for sending the delay-sensitive data in the cell 1 is greater than the preset power threshold corresponding to the cell 1 when the quantity of transmit channels used to send data is 2, the condition that the power required for sending the delay-sensitive data in each of the P cells is less than or equal to the preset power threshold corresponding to each cell is not satisfied. In another possible example, when the quantity of transmit channels used to send data is 2, if the power required for sending the delay-sensitive data in the cell 1 is less than the preset power threshold (7.5 W) corresponding to the cell 1, and the power required for sending the delay-sensitive data in the cell 2 is less than the preset power threshold (10 W) corresponding to the cell 1, that is, the power required for sending the delay-sensitive data in each of the P cells is less than or equal to the preset power threshold corresponding to each cell, the network device may also send the data of the K to-be-scheduled terminals in the second time domain unit of the P cells. Further, when sending the data of the K to-be-scheduled terminals in the second time domain unit of the P cells, the network device may disable six transmit paths, and send the data of the K to-be-scheduled terminals by using two transmit channels.

In this embodiment of this application, when the quantity of transmit channels used to send data is 2, the power required for sending the delay-sensitive data in each of the P cells is less than or equal to the preset power threshold corresponding to each cell. When the quantity of transmit channels used to send data is 4, the power required for sending the delay-sensitive data in each of the P cells is also less than or equal to the preset power threshold corresponding to each cell. In this case, in an example, the network device may select the former, that is, send the delay-sensitive data by using two transmit channels, so that power consumption can be reduced more effectively. It may be understood that the network device may alternatively select four transmit channels to send the delay-sensitive data, and this can also reduce power consumption. This is not specifically limited in this embodiment of this application.

In another example, based on the description in step 201, the network device obtains the information listed in Table 6 based on the to-be-scheduled information of the M cells in the second time domain unit.

TABLE 6

Example of information obtained by the network device

| Identifier of the to-be-scheduled terminal | Required power | Delay attribute of terminal data |
|---|---|---|
| Terminal a | 20 W | Delay-sensitive |
| Terminal b | 20 W | Delay-insensitive |

TABLE 6-continued

| Example of information obtained by the network device | | |
|---|---|---|
| Identifier of the to-be-scheduled terminal | Required power | Delay attribute of terminal data |
| Terminal c | 10 W | Delay-sensitive |
| Terminal d | 20 W | Delay-insensitive |

It can be learned from Table 6 that data of the terminal a and the terminal c is delay-sensitive data, and data of the terminal b and the terminal d is delay-insensitive data. The K to-be-scheduled terminals are the terminal a and the terminal c, and the P cells are a cell 1 in which the terminal a is located and a cell 2 in which the terminal c is located. A power required by the cell 1 to send delay-sensitive data (namely, the data of the terminal a) is 20 W, and a power required by the cell 2 to send delay-sensitive data (namely, the data of the terminal c) is 10 W.

Because the power required for sending the delay-sensitive data in the cell 1 is 20 W, which is greater than each preset power threshold corresponding to the cell 1 in Table 5, in this case, the network device may send the data of the N to-be-scheduled terminals in the second time domain unit of the M cells. It should be noted that, in this embodiment of this application, if there is more than one preset power threshold corresponding to a cell, that the power required for sending the delay-sensitive data in the cell 1 is greater than the preset power threshold corresponding to the cell 1 may mean that the power required for sending the delay-sensitive data in the cell 1 is greater than each preset power threshold corresponding to the cell 1.

In another example, based on the description in step 201, the network device obtains the information listed in Table 7 based on the to-be-scheduled information of the M cells in the second time domain unit.

TABLE 7

| Example of information obtained by the network device | | |
|---|---|---|
| Identifier of the to-be-scheduled terminal | Required power | Delay attribute of terminal data |
| Terminal a | 10 W | Delay-insensitive |
| Terminal b | 20 W | Delay-insensitive |
| Terminal c | 10 W | Delay-insensitive |
| Terminal d | 20 W | Delay-insensitive |

It can be learned from Table 7 that data of the terminal a, the terminal b, the terminal c, and the terminal d is delay-insensitive data. In this case, the network device may stop sending data (or in other words, stop scheduling) in the second time domain unit of the M cells. For example, the network device may disable, in the second time domain unit, a transmit channel corresponding to an idle symbol. To be specific, the network device works on a PA in a symbol in which a CRS in the time domain unit is located, and the PA is disabled in another symbol, so that no data is sent in the second time domain unit of the M cells by delaying sending of the delay-insensitive data. Therefore, all transmit channels in the second time domain units can be disabled based on a symbol, and power consumption is reduced.

It should be noted that: (1) The foregoing content is described by using an example in which there are to-be-scheduled terminals in the second time domain unit in the M cells. It may be understood that, if the network device determines, in the first time domain unit, that there is no to-be-scheduled terminal in the second time domain unit in the M cells, the network device may stop sending data in the second time domain units of the M cells, so as to reduce power consumption. (2) The foregoing is described by using a plurality of cells as an example. The method in this embodiment of this application may also be applicable to a scenario of one cell (M=1), so as to achieve an effect of improving power-saving benefits of the network device.

Embodiment 2

FIG. 3 is an overall schematic flowchart of a communication method according to an embodiment of this application. As shown in FIG. 3, the method includes the following steps.

Step 301: A network device obtains, in a first time domain unit, to-be-scheduled information of M cells in a second time domain unit.

Herein, the to-be-scheduled information of the M cells in the second time domain unit may include a delay attribute of data of N to-be-scheduled terminals of the M cells in the second time domain unit, and a power required for sending data of each to-be-scheduled terminal in a cell in which the to-be-scheduled terminal is located.

Step 302: The network device determines, based on the delay attribute of the data of the N to-be-scheduled terminals, whether the data of the N to-be-scheduled terminals is delay-sensitive data, and if data of at least one to-be-scheduled terminal in the data of the N to-be-scheduled terminals is delay-sensitive data, performs step 303; or if all the data of the N to-be-scheduled terminals is delay-insensitive data, performs step 304.

Step 303: After excluding the delay-insensitive data, the network device determines whether a power required for sending the delay-sensitive data in each cell is less than or equal to a preset power threshold corresponding to the cell, and if the power required for sending the delay-sensitive data in each cell is less than or equal to the preset power threshold corresponding to the cell, performs step 305; or if the power required for sending the delay-sensitive data in each cell is greater than the preset power threshold corresponding to the cell, performs step 306.

Step 304: The network device stops sending data in the second time domain unit of the M cells.

Step 305: The network device sends the delay-sensitive data in the second time domain unit of the M cells, and optionally, does not send the delay-insensitive data.

Step 306: The network device sends the data of the N to-be-scheduled terminals in the second time domain unit of the M cells.

It may be understood that the foregoing step numbers are merely an example of an execution procedure, and do not constitute a limitation on an execution sequence of the steps.

It should be noted that the foregoing describes an execution procedure of the communication method from a perspective of the network device. In this embodiment of this application, step 301 to step 306 may be specifically performed by a baseband apparatus (for example, a scheduler or a central scheduler of each cell in a baseband apparatus) in combination with a radio frequency apparatus.

For example, the M cells include a cell 1, a cell 2, and a cell 3, the N to-be-scheduled terminals include a terminal a, a terminal b, a terminal c, and a terminal d, the terminal a and the terminal b are located in the cell 1, the terminal c is located in the cell 2, and the terminal d is located in the cell 3.

In an example, based on the structure shown in FIG. 1d, referring to FIG. 4, a scheduler of the cell 1 is used as an example. In step 301, the scheduler of the cell 1 may obtain the to-be-scheduled information of the M cells in the second time domain unit. For example, the scheduler of the cell 1 may directly obtain delay attribute information of data of the terminal a and the terminal b, a power required for sending the data of the terminal a in the cell 1, and a power required for sending the data of the terminal b in the cell 1, may receive delay attribute information of data of the terminal c sent by a scheduler of the cell 2 and a power required for sending the data of the terminal c in the cell 2, and receive delay attribute information of data of the terminal d sent by a scheduler of the cell 3 and a power required for sending the data of the terminal d in the cell 3. Further, using the information listed in Table 4 as an example, the scheduler of the cell 1 obtains a scheduling policy of the cell 1 (that is, sending the delay-sensitive data in the second time domain unit of the cell 1) by performing the determining operations in step 302 and step 303, and executes the scheduling policy of the cell 1 in combination with the radio frequency apparatus, that is, sends the data of the terminal a. It may be understood that the foregoing uses an execution process of the scheduler of the cell 1 shown in FIG. 4 as an example. Schedulers of other cells (the cell 2 and the cell 3) than the cell 1 may also separately execute the foregoing process, and details are not described again.

In another example, based on the structure shown in FIG. 1e, referring to FIG. 5, the central scheduler may determine a scheduling policy, and send the scheduling policy to schedulers of the cell 1, the cell 2, and the cell 3. Specifically, in step 301, the central scheduler may obtain the to-be-scheduled information of the M cells in the second time domain unit, for example, receive delay attribute information that is of data of the terminal a and the terminal b and that is sent by a scheduler of the cell 1, a power required for sending the data of the terminal a in the cell 1, and a power required for sending the data of the terminal b in the cell 1, receive delay attribute information of data of the terminal c sent by a scheduler of the cell 2 and a power required for sending the data of the terminal c in the cell 2, and receive delay attribute information of data of the terminal d sent by a scheduler of the cell 3 and a power required for sending the data of the terminal d in the cell 3. Further, using the information listed in Table 4 as an example, the scheduling policy determined by the central scheduler is sending the data of the terminal a in the cell 1 and sending the data of the terminal c in the cell 2, and the scheduling policy is sent to a scheduler of each cell, so that the scheduler of each cell may perform a corresponding operation in combination with the radio frequency apparatus according to the scheduling policy.

It should be noted that FIG. 4 and FIG. 5 are merely examples of possible execution processes in the two structures shown in FIG. 1d and FIG. 1e, and do not constitute a limitation on an execution time of a step or some steps. For example, the scheduler of the cell 1 shown in FIG. 4 may simultaneously perform data scheduling in the first time domain unit and determine a scheduling policy of the cell 1 in the second time domain unit. This is not specifically limited. For another example, in FIG. 4, the scheduler of the cell 1 may obtain, in the first time domain unit, to-be-scheduled information of each cell in the second time domain unit, determine a scheduling policy of the cell 1 in the second time domain unit, and further execute the scheduling policy in the second time domain unit. Alternatively, the scheduler of the cell 1 may obtain, in the first time domain unit, to-be-scheduled information of each cell in the second time domain unit, determine, in the second time domain unit, a scheduling policy of the cell 1 in the second time domain unit, and further execute the scheduling policy in the second time domain unit, as shown in FIG. 6. For another example, in FIG. 5, the central scheduler may obtain, in the first time domain unit, to-be-scheduled information of each cell in the second time domain unit, determine a scheduling policy, and send the scheduling policy to a scheduler of each cell, so that the scheduler of each cell executes the scheduling policy in the second time domain unit. Alternatively, the central scheduler may obtain, in the first time domain unit, to-be-scheduled information of each cell in the second time domain unit, determine a scheduling policy in the second time domain unit, and send the scheduling policy to a scheduler of each cell, so that the scheduler of each cell executes the scheduling policy in the second time domain unit, as shown in FIG. 7.

The foregoing mainly describes the solutions provided in this application from a perspective of interaction between the network device and the terminal. It may be understood that, to implement the foregoing functions, the network device may include corresponding hardware structures and/or software modules for performing the functions. A person skilled in the art should be easily aware that, in combination with the examples described in the embodiments disclosed in this specification, units, algorithms steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

When an integrated unit is used, FIG. 8 is a possible example block diagram of an apparatus according to an embodiment of this application. The apparatus 800 may exist in a form of software. The apparatus 800 may include a processing unit 802 and a communications unit 803. The processing unit 802 is configured to control and manage an action of the apparatus 800. The communications unit 803 is configured to support the apparatus 800 in communicating with another network entity. The apparatus 800 may further include a storage unit 801, configured to store program code and data that are of the apparatus 800.

The processing unit 802 may be a processor or a controller, such as a general-purpose central processing unit (CPU), a general-purpose processor, a digital signal processing (DSP), an application-specific integrated circuit (ASIC), a field programmable gate array (FPGA), or another programmable logic device, a transistor logic device, a hardware component, or any combination thereof. The processing unit 802 may implement or execute various example logical blocks, modules, and circuits described with reference to content disclosed in the present invention. The processor may be a combination of processors implementing a computing function, for example, a combination of one or more microprocessors, or a combination of the DSP and a microprocessor. The communications unit 803 may be a communications interface, a transceiver, a transceiver circuit, or the like, where the communications interface is a general name, and may include a plurality of interfaces during specific implementation. The storage unit 801 may be a memory.

The apparatus 800 may be the network device in any one of the foregoing embodiments, or may be a semiconductor chip disposed in the network device. The processing unit 802 may support the apparatus 800 in performing the actions of the network device in the foregoing method examples, and the communications unit 803 may support communication between the apparatus 800 and a to-be-scheduled terminal.

Specifically, in an embodiment, the processing unit is configured to determine, in a first time domain unit, whether data of N to-be-scheduled terminals in a second time domain unit in M cells of the network device is delay-sensitive data, where the M cells share a same remote radio unit RRU.

The transceiver unit is configured to: if the processing unit determines that data of K to-be-scheduled terminals of the N to-be-scheduled terminals is delay-sensitive data, the K to-be-scheduled terminals are separately located in P cells of the M cells, and a power required for sending the delay-sensitive data in each of the P cells is less than or equal to a preset power threshold corresponding to the cell, send the data of the K to-be-scheduled terminals in a second time domain unit of the P cells, where M, N, P, and K are integers greater than or equal to 1, K is less than or equal to N, and P is less than or equal to M.

In a possible design, the RRU includes a plurality of transmit channels.

The transceiver unit is specifically configured to: send the data of the K to-be-scheduled terminals through some of the plurality of transmit channels based on a power bearing capability of the plurality of transmit channels and the power required for sending the delay-sensitive data in each of the P cells, and disable transmit channels in the plurality of transmit channels other than the some transmit channels.

In a possible design, a power for sending the data of the K to-be-scheduled terminals on each of the some transmit channels is W times a sum of power required for sending the delay-sensitive data in all of the P cells; and a value of W is obtained based on a quantity of the some transmit channels.

In a possible design, the transceiver unit is further configured to: if the processing unit determines that a power required for sending the delay-sensitive data in a first cell of the P cells is greater than a preset power threshold corresponding to the first cell, send the data of the N to-be-scheduled terminals in the second time domain unit of the M cells.

In a possible design, the transceiver unit is further configured to: if the processing unit determines that all the data of the N to-be-scheduled terminals is delay-insensitive data, stop sending data in the second time domain unit of the M cells.

In a possible design, the transceiver unit is specifically configured to disable, in the second time domain unit, a transmit channel corresponding to an idle symbol.

In a possible design, the processing unit is further configured to: obtain a power required for sending data of each to-be-scheduled terminal in a cell in which the to-be-scheduled terminal is located, where the power required for sending the delay-sensitive data in each of the P cells is a sum of powers required for sending, in the cell, delay-sensitive data of one or more to-be-scheduled terminals in the cell.

FIG. 9 is a schematic diagram of an apparatus according to this application. The apparatus may be the network device in the foregoing embodiment. The apparatus 900 includes a processor 902, a communications interface 903, and a memory 901. Optionally, the apparatus 900 may further include a bus 904. The communications interface 903, the processor 902, and the memory 901 may be connected to each other by using a communications line 904. The communications line 904 may be a peripheral component interconnect (PCI for short) bus, an extended industry standard architecture (EISA for short) bus, or the like. The communications line 904 may be classified into an address bus, a data bus, a control bus, and the like. For ease of representation, only one thick line is used to represent the bus in FIG. 9, but this does not mean that there is only one bus or only one type of bus.

The processor 902 may be a CPU, a microprocessor, an ASIC, or one or more integrated circuits configured to control program execution in the solutions of this application.

The communications interface 903 may be any apparatus like a transceiver, and is configured to communicate with another device or a communications network, such as Ethernet, a RAN, a wireless local area network (WLAN), or a wired access network.

The memory 901 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, or an optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and that can be accessed by a computer, but is not limited thereto. The memory may exist independently, and is connected to the processor by using the communications line 904. Alternatively, the memory may be integrated with the processor.

The memory 901 is configured to store computer-executable instructions for executing the solutions in this application, and the processor 902 controls the execution of the computer-executable instructions. The processor 902 is configured to execute the computer-executable instructions stored in the memory 901, to implement the session handling method provided in the foregoing embodiments of this application.

Optionally, the computer-executable instructions in this embodiment of this application may also be referred to as application program code. This is not specifically limited in this embodiment of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general processor, a digital signal processor, an application-specific integrated circuit (ASIC), a field programmable gate array (FPGA) or another programmable logic apparatus, discrete gate or transistor logic, a discrete hardware component, or a design of any combination thereof. The general processor may be a microprocessor. Optionally, the general processor may also be any traditional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information to the storage medium. Alternatively, the storage medium may further be integrated into a processor. The processor and the storage medium may be arranged in an ASIC, and the ASIC may be arranged in a terminal device. Alternatively, the processor and the storage medium may also be arranged in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and the embodiments thereof, clearly, various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. Clearly, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
    determining, by a network device in a first time domain unit, whether respective data of each of N to-be-scheduled terminals in a second time domain unit in M cells of the network device is delay-sensitive data, wherein the M cells share a same remote radio unit (RRU); and
    in response to determining that respective data of each of K to-be-scheduled terminals of the N to-be-scheduled terminals is delay-sensitive data, that the K to-be-scheduled terminals are separately located in P cells of the M cells, and that a respective power required to send the delay-sensitive data in each of the P cells is less than or equal to a preset power threshold corresponding to the respective cell, sending, by the network device, the data of the K to-be-scheduled terminals in a second time domain unit of the P cells; and
    wherein M, N, P, and K are integers greater than or equal to 1, K is less than or equal to N, and P is less than or equal to M.

2. The method according to claim 1, wherein the RRU comprises a plurality of transmit channels; and
    wherein sending, by the network device, the data of the K to-be-scheduled terminals in the second time domain unit of the P cells comprises:
        sending, by the network device, the data of the K to-be-scheduled terminals through a portion of the plurality of transmit channels based on a power bearing capability of the portion of the plurality of transmit channels and the respective power required to send the respective delay-sensitive data in each of the P cells, and disabling transmit channels in the plurality of transmit channels other than the portion of the plurality of transmit channels.

3. The method according to claim 2, wherein:
    a power for sending the data of the K to-be-scheduled terminals on each transmit channel of the portion of the plurality of transmit channels is W times a sum of powers required for sending the delay-sensitive data in all of the P cells; and
    a value of W is obtained based on a quantity of channels of the portion of the plurality of transmit channels.

4. The method according to claim 1, further comprising:
    in response to determining that a power required to send delay-sensitive data in a first cell of the P cells is greater than a preset power threshold corresponding to the first cell, sending, by the network device, the data of the N to-be-scheduled terminals in the second time domain unit of the M cells.

5. The method according to claim 1, further comprising:
    in response to determining that all the respective data of the N to-be-scheduled terminals is delay-insensitive data, stopping, by the network device, sending the data of the N to-be-scheduled terminals in the second time domain unit of the M cells.

6. The method according to claim 5, wherein stopping, by the network device, sending the data of the N to-be-scheduled terminals in the second time domain unit of the M cells comprises:
    disabling, by the network device in the second time domain unit, a transmit channel corresponding to an idle symbol.

7. The method according to claim 1, further comprising:
    obtaining, by the network device, a power required to send data of each to-be-scheduled terminal in a respective cell in which the respective to-be-scheduled terminal is located, wherein the power required to send the delay-sensitive data in each of the P cells is a sum of powers required to send, in the respective cell, delay-sensitive data of one or more to-be-scheduled terminals in the respective cell.

8. An apparatus, comprising:
a processor; and
a non-transitory memory; and
wherein instructions are stored in the non-transitory memory, and when the instructions are run by the processor, the apparatus is caused to:
determine, in a first time domain unit, whether respective data of each of N to-be-scheduled terminals in a second time domain unit in M cells of a network device is delay-sensitive data, wherein the M cells share a same remote radio unit (RRU); and
in response to determining that respective data of K to-be-scheduled terminals of the N to-be-scheduled terminals is delay-sensitive data, that the K to-be-scheduled terminals are separately located in P cells of the M cells, and that a respective power required to send the respective delay-sensitive data in each of the P cells is less than or equal to a preset power threshold corresponding to the respective cell, sending the data of the K to-be-scheduled terminals in a second time domain unit of the P cells; and
wherein M, N, P, and K are integers greater than or equal to 1, K is less than or equal to N, and P is less than or equal to M.

9. The apparatus according to claim 8, wherein the RRU comprises a plurality of transmit channels; and
wherein when the instructions are run by the processor, the apparatus is caused to:
send the data of the K to-be-scheduled terminals through a portion of the plurality of transmit channels based on a power bearing capability of the portion of the plurality of transmit channels and the respective power required to sending the respective delay-sensitive data in each of the P cells, and disable transmit channels in the plurality of transmit channels other than the portion of the plurality of transmit channels.

10. The apparatus according to claim 9, wherein:
a power for sending the data of the K to-be-scheduled terminals on each transmit channel of the plurality of transmit channels is W times a sum of powers required for sending the delay-sensitive data in all of the P cells; and
a value of W is obtained based on a quantity of channels of the portion of the plurality of transmit channels.

11. The apparatus according to claim 8, wherein when the instructions are run by the processor, the apparatus is caused to:
in response to determining that a power required to send delay-sensitive data in a first cell of the P cells is greater than a preset power threshold corresponding to the first cell, send the data of the N to-be-scheduled terminals in the second time domain unit of the M cells.

12. The apparatus according to claim 8, wherein when the instructions are run by the processor, the apparatus is further caused to:
in response to determining that all the data of the N to-be-scheduled terminals is delay-insensitive data, stop sending the data of the N to-be-scheduled terminals in the second time domain unit of the M cells.

13. The apparatus according to claim 12, wherein when the instructions are run by the processor, the apparatus is further caused to:
disable, in the second time domain unit, a transmit channel corresponding to an idle symbol.

14. The apparatus according to claim 8, wherein when the instructions are run by the processor, the apparatus is further caused to:
obtain a power required to send data of each to-be-scheduled terminal in a respective cell in which the respective to-be-scheduled terminal is located, wherein the power required to send the delay-sensitive data in each of the P cells is a sum of powers required to send, in the respective cell, delay-sensitive data of one or more to-be-scheduled terminals in the respective cell.

15. A computer-readable storage medium, comprising instructions, wherein when the instructions are run on a computer, the computer is enabled to:
determine, in a first time domain unit, whether respective data of each of N to-be-scheduled terminals in a second time domain unit in M cells of a network device is delay-sensitive data, wherein the M cells share a same remote radio unit (RRU); and
in response to determining that respective data of each of K to-be-scheduled terminals of the N to-be-scheduled terminals is delay-sensitive data, that the K to-be-scheduled terminals are separately located in P cells of the M cells, and that a respective power required to send the delay-sensitive data in each of the P cells is less than or equal to a preset power threshold corresponding to the respective cell, send the data of the K to-be-scheduled terminals in a second time domain unit of the P cells; and
wherein M, N, P, and K are integers greater than or equal to 1, K is less than or equal to N, and P is less than or equal to M.

16. The computer-readable storage medium according to claim 15, wherein the RRU comprises a plurality of transmit channels; and
wherein sending the data of the K to-be-scheduled terminals in the second time domain unit of the P cells comprises:
sending the data of the K to-be-scheduled terminals through a portion of the plurality of transmit channels based on a power bearing capability of the portion of the plurality of transmit channels and the respective power required to send the respective delay-sensitive data in each of the P cells, and disabling transmit channels in the plurality of transmit channels other than the portion of the plurality of transmit channels.

17. The computer-readable storage medium according to claim 16, wherein:
a power for sending the data of the K to-be-scheduled terminals on each transmit channel of the portion of the plurality of transmit channels is W times a sum of powers required for sending the delay-sensitive data in all of the P cells; and
a value of W is obtained based on a quantity of channels of the portion of the plurality of transmit channels.

18. The computer-readable storage medium according to claim 15, wherein when the instructions are run on a computer, the computer is further enabled to:
in response to determining that a power required to send delay-sensitive data in a first cell of the P cells is greater than a preset power threshold corresponding to the first cell, sending, by the network device, the data of the N to-be-scheduled terminals in the second time domain unit of the M cells.

19. The computer-readable storage medium according to claim 15, wherein when the instructions are run on a computer, the computer is further enabled to:

in response to determining that all the respective data of the N to-be-scheduled terminals is delay-insensitive data, stopping sending the data of the N to-be-scheduled terminals in the second time domain unit of the M cells.

20. The computer-readable storage medium according to claim 19, wherein stopping sending the data of the N to-be-scheduled terminals in the second time domain unit of the M cells comprises:

disabling, in the second time domain unit, a transmit channel corresponding to an idle symbol.

* * * * *